(12) United States Patent
Lin (10) Patent No.: US 11,921,599 B2
(45) Date of Patent: Mar. 5, 2024

(54) CONTROL METHOD AND ELECTRONIC DEVICE

(71) Applicant: Lenovo (Beijing) Limited, Beijing (CN)

(72) Inventor: Zebo Lin, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 255 days.

(21) Appl. No.: 17/550,761

(22) Filed: Dec. 14, 2021

(65) Prior Publication Data

US 2022/0318110 A1    Oct. 6, 2022

(30) Foreign Application Priority Data

Mar. 31, 2021    (CN) .......................... 202110346707.8

(51) Int. Cl.
| | | |
|---|---|---|
| *G06F 12/00* | (2006.01) | |
| *G06F 11/22* | (2006.01) | |
| *G06F 21/57* | (2013.01) | |

(52) U.S. Cl.
CPC ........ *G06F 11/2284* (2013.01); *G06F 21/572* (2013.01); *G06F 21/575* (2013.01)

(58) Field of Classification Search
CPC .. G06F 11/2284; G06F 21/572; G06F 21/575; G06F 9/441
See application file for complete search history.

(56) References Cited

U.S. PATENT DOCUMENTS

| | | | | |
|---|---|---|---|---|
| 5,369,707 A | * | 11/1994 | Follendore, III | H04L 63/083 |
| | | | | 713/165 |
| 7,971,056 B2 | * | 6/2011 | Westerinen | H04L 9/3236 |
| | | | | 713/165 |
| 10,037,206 B2 | * | 7/2018 | Wang | G06F 9/30043 |
| 10,416,981 B2 | * | 9/2019 | Ragupathi | G06F 9/4416 |
| 11,119,947 B2 | * | 9/2021 | Villatel | G06F 12/1441 |
| 2005/0138171 A1 | * | 6/2005 | Slaight | H04L 12/4641 |
| | | | | 709/225 |
| 2006/0020844 A1 | * | 1/2006 | Gibbons | G06F 11/142 |
| | | | | 714/E11.134 |
| 2013/0174250 A1 | * | 7/2013 | Chen | G06F 21/572 |
| | | | | 726/18 |
| 2017/0185429 A1 | * | 6/2017 | Jeansonne | H04L 9/3242 |
| 2020/0241747 A1 | * | 7/2020 | Gupta | G06F 21/62 |
| 2023/0111120 A1 | * | 4/2023 | Thakre | G06F 9/441 |
| | | | | 713/2 |
| 2023/0195898 A1 | * | 6/2023 | Braduke | G06F 21/575 |
| | | | | 713/2 |

\* cited by examiner

*Primary Examiner* — Shawn X Gu
*Assistant Examiner* — Mohammad S Hasan
(74) *Attorney, Agent, or Firm* — ANOVA LAW GROUP, PLLC (57) ABSTRACT

Control method and electronic device are provided. The electronic device includes: a controller; a first memory, connected to the controller and storing at least a boot system; and a second memory, connected to the controller, for storing update data of the boot system. After the electronic device completes a power-on self-test, the controller controls the first memory to be in an inaccessible state and controls the second memory to be in an accessible state.

20 Claims, 3 Drawing Sheets

CONTROL METHOD AND ELECTRONIC DEVICE

CROSS-REFERENCE TO RELATED APPLICATION

This application claims priority of Chinese Patent Application No. 202110346707.8, filed on Mar. 31, 2021, the entire contents of which are hereby incorporated by reference.

FIELD OF THE DISCLOSURE

The present disclosure generally relates to the field of data processing technology and, more particularly, relates to a control method and an electronic device.

BACKGROUND

If a boot program, aka a boot system such as a basic input output system (BIOS) in an electronic device is attacked by some illegal operations, the electronic device or component where the boot program is located may operate abnormally.

At present, a boot program can only be restored by some methods after the boot program is attacked. But illegal attacks on the boot program cannot be reduced.

BRIEF SUMMARY OF THE DISCLOSURE

One aspect of the present disclosure provides an electronic device. The electronic device includes: a controller; a first memory, connected to the controller and storing at least a boot system; and a second memory, connected to the controller, for storing update data of the boot system. After the electronic device completes a power-on self-test, the controller controls the first memory to be in an inaccessible state and controls the second memory to be in an accessible state.

Another aspect of the present disclosure provides a control method. The control method includes loading and running by a host system a boot system in a first memory during a booting process of an electronic device; and controlling the first memory to be in an inaccessible state and controlling a second memory to be in an accessible state by a controller after the electronic device completes a power-on self-test, connecting the second memory to the controller for storing update data of the boot system.

Another aspect of the present disclosure provides a computer-readable storage medium storing at least one instruction and at least one program, code set, or instruction set. The at least one instruction, and the at least one program, code set, or instruction set are loaded and executed by the processor to implement a control method. The control method includes loading and running by a host system a boot system in a first memory during a booting process of an electronic device; and controlling the first memory to be in an inaccessible state and controlling a second memory to be in an accessible state by a controller after the electronic device completes a power-on self-test, connecting the second memory to the controller for storing update data of the boot system.

Other aspects of the present disclosure can be understood by a person skilled in the art in light of the description, the claims, and the drawings of the present disclosure.

BRIEF DESCRIPTION OF THE DRAWINGS

To illustrate technical solutions more clearly in embodiments of the present disclosure, the following will briefly introduce accompanying drawings that need to be used in a description of the embodiments. Obviously, the accompanying drawings in the following description are only some embodiments of the present disclosure. For a person skilled in the art, other drawings can be obtained based on the accompanying drawings without creative efforts.

Terms "first", "second", "third", "fourth" and the like (if any) in the present specification, claims and accompanying drawings are configured to distinguish similar parts, but are not necessarily configured to describe a specific order or sequence. It is to be understood that data so used may be interchanged under appropriate circumstance, so that the embodiments of the present disclosure described herein can be implemented in a sequence other than the ones shown herein.

DETAILED DESCRIPTION

The following will clearly and completely describe the technical solutions in the embodiments of the present disclosure with reference to the accompanying drawings in the embodiments of the present disclosure. Apparently, the described embodiments are merely some but not all of the embodiments of the present disclosure. Based on the embodiments of the present disclosure, all other embodiments obtained by a person skilled in the art without creative efforts shall fall within the protection scope of the present disclosure.

To facilitate understanding, a composition structure of an electronic device of the present disclosure is firstly introduced.

Figure 1:
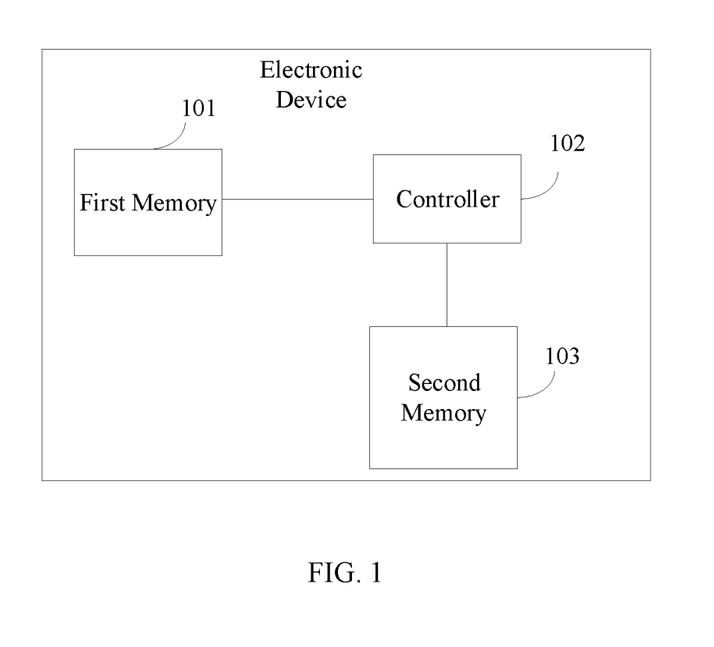
FIG. 1 illustrates a composition structure diagram of an electronic device consistent with various embodiments of the present disclosure.

FIG. 1 illustrates a composition structure diagram of an electronic device consistent with various embodiments of the present disclosure. The electronic device includes: a controller; a first memory, connected to the controller and storing at least a boot system; and a second memory, connected to the controller, for storing update data of the boot system. After the electronic device completes a power-on self-test, the controller controls the first memory to be in an inaccessible state and controls the second memory to be in an accessible state.

The first memory is a memory where the boot system is located. Therefore, the electronic device runs the boot system based on data of the boot system in the first memory.

The second memory may be set in the present disclosure and configured to store update data requested for an operation of the boot system after the boot system runs. Therefore, the second memory does not store complete data of the boot system, but only stores operation data related to the operation of the boot system.

Types of memory used by the first memory and the second memory may have many possibilities, which are not limited herein. For example, if the controller communicates with memories based on a serial peripheral interface (SPI), the first memory and the second memory can be SPI flash devices.

In the present disclosure, the boot system can be a firmware program in a certain component of the electronic device, or a system firmware program of the electronic device. Depending on the boot system, the first memory and a setting position thereof in the electronic device may also be different. In the following, several possible situations will be taken as examples to illustrate.

In the present disclosure, a specific form of the controller may have many possibilities, which may be specifically set as required. For example, the controller can be an embedded controller (EC), a field programmable gate array (FPGA), or other control chip.

In the present disclosure, controlling by the controller the first memory to be in an inaccessible state makes the first memory in an invisible state to the electronic device, so that the electronic device cannot access the first memory.

As can be seen from the above, in the present disclosure, After the electronic device completes a power-on self-test, the controller controls the first memory configured to store the boot system in the electronic device to be in an inaccessible state, so that illegal operations to operate the boot system in the first memory can be avoided, thereby avoiding the illegal operations to attack the boot system in the first memory.

The controller controls the first memory to be in an inaccessible state and controls the second memory to be in an accessible state at a same time, so that an operation of the electronic device on data related to the boot system is transferred to the second memory without affecting a normal operation of the data related to the boot system.

The boot system of the present disclosure may have many possibilities, and several possibilities are described below.

In a possible implementation, the boot system may include, in addition to a system boot program configured to implement a power-on self-test and a system self-test of the electronic device, a firmware program of a processing device in the electronic device.

For example, the boot system may include a firmware program in an EC. Accordingly, the first memory may store the firmware program of the EC. When the EC cannot access a firmware program stored in a memory of the EC, the firmware program in the first memory may be accessed via the boot program. The controller can be a FPGA described above or another EC that is set separately from the EC.

For another example, the boot system may include a firmware program in a graphics card. Accordingly, the first memory can store the firmware program in the graphics card, and the graphics card can access the firmware program in the first memory via the boot system.

In another possible implementation, the boot system may be a system boot program configured to implement a power-on self-test and a system self-test of the electronic device.

For example, the boot system can be a basic input output system (BIOS), or a unified extensible firmware interface (UEFI).

Accordingly, the first memory may be a memory configured to store a BIOS system or a UEFI system in the electronic device and the first memory is also referred to as a system memory.

For example, the first memory may be a memory connected to a host system in the electronic device.

In the following, taking a system boot program such as a BIOS or a UEFI as the boot system as an example, the electronic device of the present disclosure is introduced.

Figure 2:
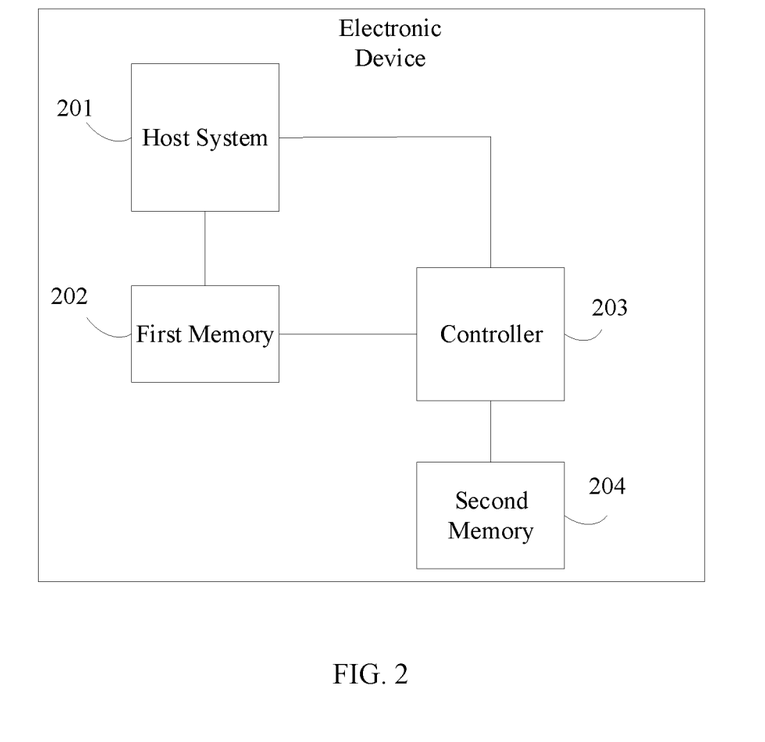
FIG. 2 illustrates another composition structure diagram of an electronic device consistent with various embodiments of the present disclosure.

FIG. 2 illustrates another composition structure diagram of an electronic device consistent with various embodiments of the present disclosure.

The electronic device includes a host system 201; a first memory 202, connected to the host system; a controller 203, connected to the first memory and the host system; and a second memory 204 connected to the controller 203.

The first memory 202 stores at least a boot system, such as a BIOS or UEFI system.

The host system 201 is configured to load and run the boot system in the first memory during a boot process of the electronic device. By running the boot program, related operations including a power-on self-test of the electronic device can be completed.

For example, taking the boot system as a BIOS system as an example, after the electronic device is powered on, the electronic device may load and run the BIOS system, and complete related operations including a power-on self-test via the BIOS system.

The host system is a core part of the electronic device. An operating system of the electronic device can be run on the host system, The host system may at least include a central processing unit (CPU) of the electronic device. For example, the host system may be a system including a CPU and a southbridge. For another example, the host system may integrate a motherboard chip of the CPU and so on.

In the present disclosure, after the electronic device completes a power-on self-test, the controller 203 may control the first memory to be in an inaccessible state and control the second memory to be in an accessible state.

When the first memory is in an accessible state, the operating system, the boot system, and programs running on the host system can all access the first memory. While the first memory is in an inaccessible state, the operating system, the boot system, and other programs cannot access the first memory.

Since the second memory is not connected to the host system, the host system cannot directly access the second memory. Therefore, the host system's operations on the second memory all require the controller.

Furthermore, to reduce illegal operations in the second memory, after obtaining an operation request, the host system may also perform a filtering processing and forward the filtered operation request that is not an illegal operation request to the controller.

Specifically, the host system 201 is also configured to obtain an operation request for the boot system after the electronic device completes a power-on self-test. The operation request is configured to request to operate the boot system. If the operation request is confirmed not to be an illegal operation request, the host system 201 forwards the operation request to the controller 203.

The operation request may be a write operation request, a modification operation request, or the like for data of the boot system.

The operation request that is not an illegal operation request refers to an operation request set by the host system that does not cause an attack on data of the boot system.

Accordingly, the controller is further configured to store update data for the boot system in the second memory based on the operation request.

The update data of the boot system is determined based on the operation request and, is latest data to which the boot system eventually needs to be updated.

For example, if the operation request is a write operation request, the controller may store data of the boot system requested by the write operation in the second memory.

For another example, if the operation request is a modification operation request for requesting to modify data of the boot system, since the boot system is not stored in the second memory, only data generated by the operation request for the boot system is stored in the second memory, a data item of the boot system that is expected to be modified by the modification operation and a final desired target value of the data item may be directly stored in the second memory. For example, if the operation request is to modify a value of a parameter A in the boot system from a to b, the operation request may indicate that the value of the parameter A is modified to value b. Therefore, the value of the parameter A may be stored in the second memory as b.

In one embodiment, after the electronic device completes a power-on self-test, the controller can control the first memory connected to the host system and configured to store the boot system to be in an inaccessible state, so that the host system cannot access the first memory. Therefore, even if there is an improper operation, the improper operation cannot directly attack the boot system.

At a same time, the second memory is connected to the controller outside the host system. Since the second memory is not directly connected to the host system, the host system cannot directly access the second memory. Moreover, the host system filters the operation request, and forwards the operation request that is not an illegal operation request to the controller, so that the controller does not have illegal data in update data of the boot system stored in the second memory, which ensures a security of data in the second memory.

Since the boot system in the first memory of the electronic device may be accessed after the electronic device completes a power-on self-test, to ensure a normal operation of data for the boot system after the electronic device completes the power-on self-test, in the present disclosure, update data of the boot system may be stored in the second memory. Based on the above, to enable user's update data for the boot system to take effect, after the electronic device is powered off, if the electronic device is powered on again, the boot system in the first memory can be updated according to update data in the second memory.

Therefore, in one optional embodiment, during a power-on self-test process of the electronic device, the host system may also update the boot system in the first memory according to the update data stored in the second memory.

In practical applications, controlling by the controller the first memory to be in an inaccessible state has may implementations. For example, in a possible implementation, the controller may control to cut off a power supply of the first memory to control the first memory to be in an inaccessible state.

In a possible implementation, the electronic device may further have a power supply module. The first memory may be connected to the power supply module via a controllable port on the controller.

Accordingly, the controller may cut off a power supply of the first memory by controlling to cut off a connection between the controllable port and the power supply module, so that the first memory is in an inaccessible state.

For example, the controllable port can be a general-purpose input/output (GPIO) port or the like, which is not limited herein.

Figure 3:
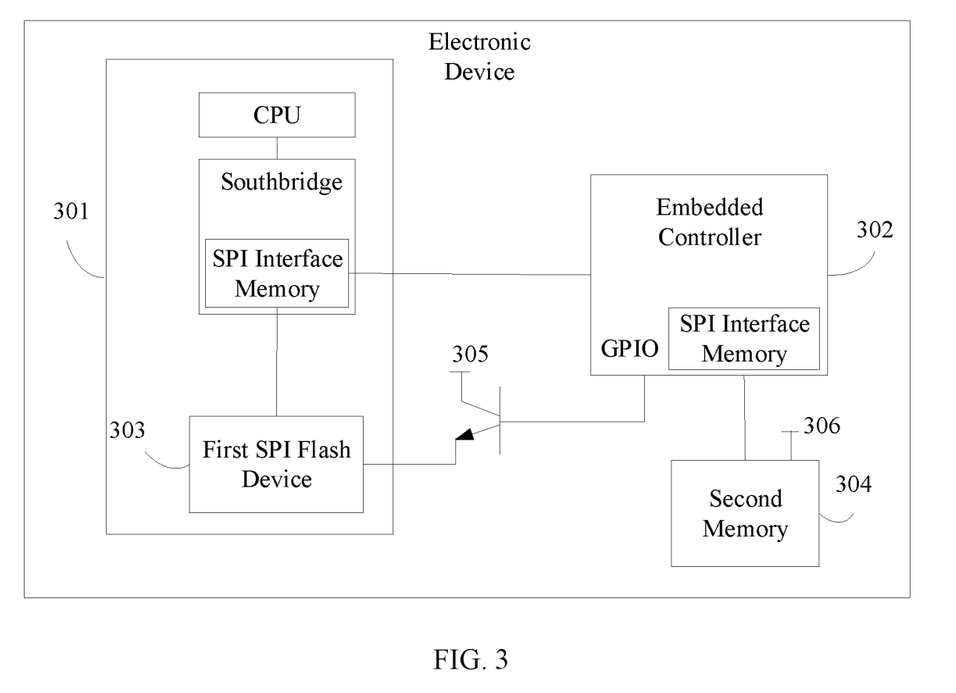
FIG. 3 illustrates a composition structure diagram of an electronic device in an application example consistent with various embodiments of the present disclosure.

To facilitate understanding solutions of the present disclosure, the following illustrates an application example of the electronic device of the present disclosure, in which an embedded controller is taken as the controller in the electronic device, a BIOS system is taken as the boot system, and the host system and the controller are assumed to communicate via SPI. FIG. 3 illustrates a composition structure diagram of an electronic device in an application example consistent with various embodiments of the present disclosure.

As can be seen from FIG. 3, the electronic device includes a host system 301 and an embedded controller 302 connected to a host system.

The host system 301 may be connected to a first SPI flash device 303 for storing the BIOS program.

According to different types of the host system, a connection mode of the first SPI flash device and the host system is also different. For example, in one situation shown in FIG. 1, when the host system is a motherboard including a CPU system, the first SPI flash device can be set on the motherboard as part of the host system.

For another example, when the host system is a chip integrated with a CPU or the like, the host system may be connected to the first SPI flash device, which is not limited herein.

In FIG. 3, taking the host system including a CPU and a southbridge as an example, the CPU is connected to the first SPI flash device via the southbridge. The southbridge may further include an SPI interface controller. The southbridge is connected to the first SPI flash device via the SPI interface controller. The SPI interface controller is configured for connection control of devices based on a SPI standard protocol. As shown in FIG. 3, the first SPI flash device and the embedded controller are connected via the SPI interface controller in the host system.

In the present disclosure, a second SPI flash device 304 is connected to the embedded controller 302. The second SPI flash device 304 is configured to store update data of the BIOS program after the electronic device completes a power-on self-test.

As shown in FIG. 3, the embedded controller 302 is provided with a GPIO port. The first SPI flash device is connected to a power input terminal 305 of a power supply module via the GPIO port.

Based on the above, the embedded controller 302 controls the power input terminal 305 to connect with the first SPI device by controlling the GPIO port, so that the power supply module can supply power to the first SPI device.

Accordingly, if the embedded controller 302 cuts off a connection between the power input terminal and the first SPI device via the GPIO port, the first SPI flash device is in a power-off state. The first SPI flash device is invisible to the host system. Therefore, an operating system and software programs on the electronic device cannot access the first SPI flash device.

The embedded controller 302 is connected to the second SPI flash device. For example, the embedded controller 302 may be connected to the second SPI flash device via the SPI interface controller.

The second SPI flash device is directly connected to a power input terminal 306 of a power supply module to ensure that the second SPI flash device is in a continuous power supply state, so that the embedded controller may access the second SPI flash device.

In the present disclosure, after the electronic device is started, the host system may load and run a BIOS program in the first SPI flash device to complete related operations such as a power-on self-test via the BIOS program.

Accordingly, after the host system completes a power-on self-test, the host system sends a notification indicating a completion of the power-on self-test to the embedded controller. After receiving the notification, the embedded controller cuts off a power supply of the first SPI flash device in a way described above. The electronic device obtains the operation request for the BIOS program via the host system (e.g., an operating system running on the host system). The host system (e.g., the BIOS program on the host system) performs a risk filtering on the operation request and forward the operation request that is not an illegal operation request to the embedded controller.

In combination with a related introduction of a structure of the above electronic device, a control method of the present disclosure is introduced below in conjunction with flowcharts.

Figure 4:
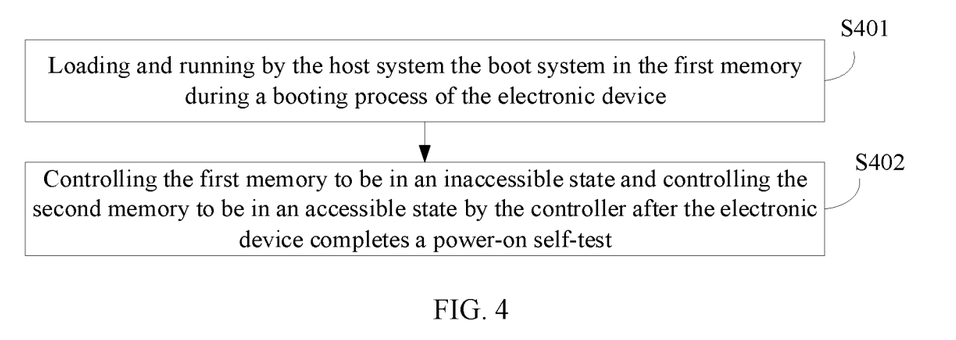
FIG. 4 illustrates a flowchart of a control method consistent with various embodiments of the present disclosure.

FIG. 4 illustrates a flowchart of a control method consistent with various embodiments of the present disclosure. The control method includes the following steps.

S401: loading and running by the host system the boot system in the first memory during a booting process of the electronic device.

The first memory is connected to the host system and configured to store the boot system.

S402: controlling the first memory to be in an inaccessible state and controlling the second memory to be in an accessible state by the controller after the electronic device completes a power-on self-test.

The second memory is connected to the controller and is configured to store update data of the boot system. Details can be referred to previous related introductions.

Like previous device embodiments, after the electronic device completes a power-on self-test, the controller controls the first memory configured to store the boot system in the electronic device to be in an inaccessible state, so that arbitrary operations on the boot system in the first memory can be avoided, thereby avoiding illegal operations to attack the boot system in the first memory.

The controller controls the first memory to be in an inaccessible state and controls the second memory to be in an accessible state at a same time, so that an operation of the electronic device for data related to the boot system is transferred to the second memory, without affecting a normal operation of the data related to the boot system operate.

To reduce a storage of update data that cause attacks on the boot system in the second memory, in the present disclosure, after the electronic device completes a power-on self-test, the host system may obtain the operation request for the boot system. The operation request is configured to request an operation of the boot system. For example, the host system can obtain the operation request via the operating system or the boot system.

Accordingly, if the host system confirms that the operation request is not an illegal operation request, the host system sends the operation request to the controller, so that the controller stores update data generated by the operation in the second memory.

For example, the host system can determine whether the operation request is an illegal request via the operating system.

In an optional implementation, the host system may determine whether the operation request is an illegal operation request via the boot system and forward the operation request to the controller when the boot system confirms the operation request is an illegal operation request.

Determining by the host system whether the operation request is an illegal operation request has many possibilities.

For example, in a possible situation, to ensure that the operation request is not an illegal operation, the operation request is generally required to carry verification data for legality identification. If the verification data carried in the operation request belongs to configured legality verification data, the operation request can be confirmed not to be an illegal operation.

The legality verification data can be one or more of passwords set by a user in the boot system, a manufacturer's key signature of the boot system and the like, which may be specifically set as required.

In another possible situation, if the operation request is configured to request to update parameter data of the boot system, whether the parameter data requested to be updated by the operation request conforms to a parameter variable format defined in a system specification of the boot system may also be determined. Accordingly, if the updated parameter data requested by the operation request conforms to the parameter variable format defined in the system specification of the boot system, the operation request can be confirmed not to be an illegal operation request.

In practical applications, the above two possible situations can also be combined to comprehensively determine whether the operation request is an illegal operation request. For example, when the operation request is configured to request to update parameter data of the boot system, only if the verification data carried by the operation request is legality verification data, and the parameter data requested to be updated by the operation request conforms to the parameter variable format defined in the system specification of the boot system, the operation request is determined not to be an illegal operation request.

Determination conditions for an illegal operation request have other possibilities, which is not limited herein.

To ensure that the operation request for the boot system may be transferred to the second memory, in the present disclosure, after an operating system or some application programs initiate the operation request to the host system, a software program can be pre-set to trigger a generation of a system management interrupt (SMI) indication. In the present disclosure, a SMI is combined to enable the host system to perform an illegality detection for the operation request.

Specifically, if the host system detects the system management interrupt indication and confirms that the operation request is not an illegal operation request, the operation request is sent to the controller.

Confirming by the host system that the operation request is not an illegal operation request may be confirming that the operation request meets legal operation conditions. The legal operation conditions may include: the system management interrupt indication is triggered and generated by a software program with triggering authority.

When the operation request is a legal operation request, after the operating system or application programs generates the operation request, the software program that triggers system management interrupts must be called to generate a system management interrupt. Based on the above, the host system analyzes a legitimacy of the operation request. If the operation request is not an illegal operation request, the host system forwards the operation request to the controller. Therefore, the host system may determine whether the operation request is legal based on whether a detected system management interrupt indication is legal.

The legal operation conditions can also be one or more of the several possible situations described above in which the operation request is not an illegal operation request, which is not limited herein.

Ways to determine whether the operation request is an illegal operation request can refer to one or more of the several situations described above, which is not limited herein.

In one optional embodiment, after obtaining a SMI indication, the host system enters a system management mode (SMM) of the host system such as a CPU, so that a BIOS system, aka a BIOS program or a UFFI system, aka a UEFI program processes the operation request. Therefore, the present disclosure may forward the operation request to the controller for processing after the BIOS system or UEFI system detects that the operation request is not an illegal operation request.

The following takes the boot system as a BIOS system, the controller as an embedded controller. After the host system obtains a system management interrupt, a BIOS program processes the operation request as an example to illustrate.

Figure 5:
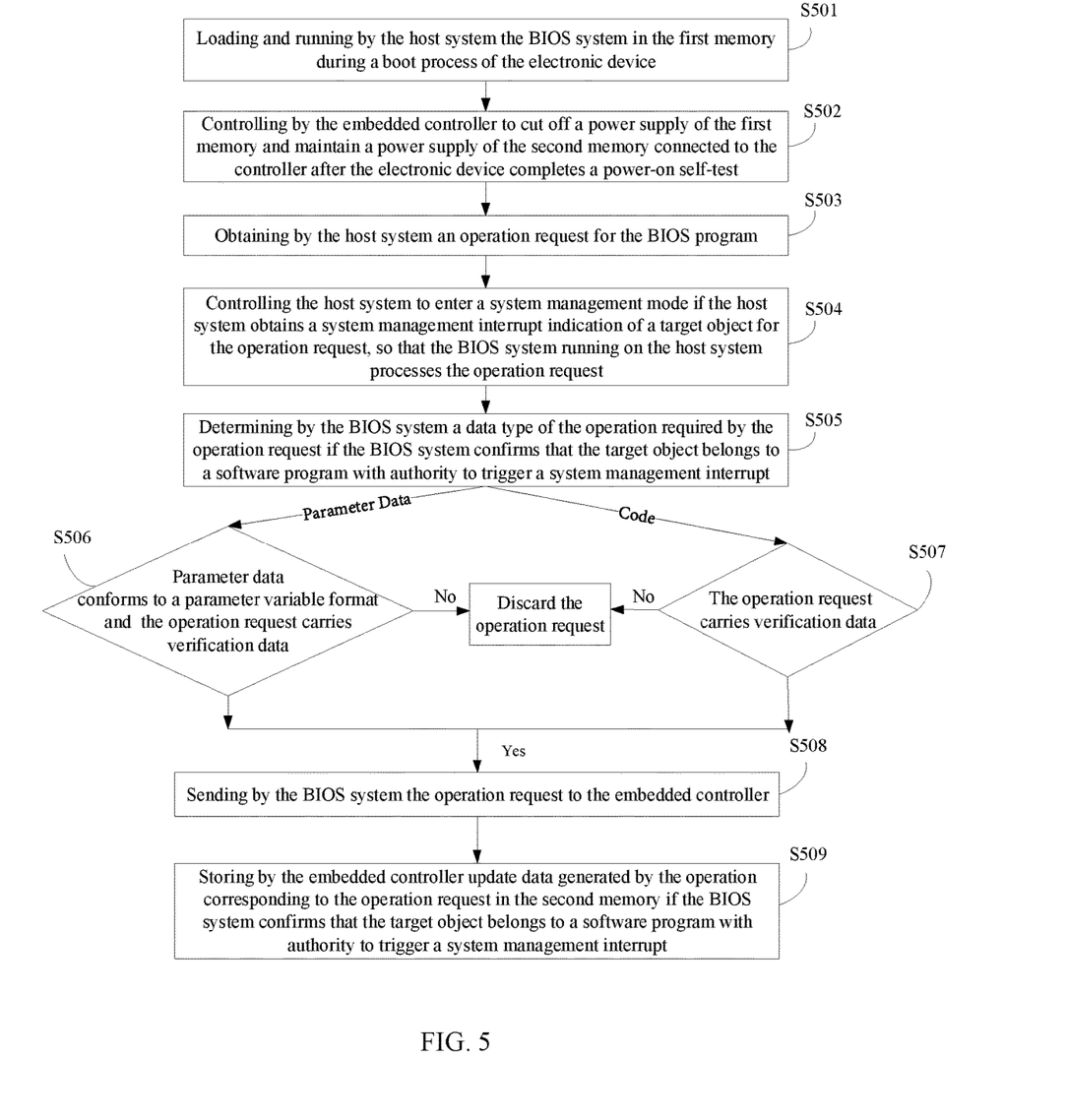
FIG. 5 illustrates another flowchart of a control method consistent with various embodiments of the present disclosure.

FIG. 5 illustrates a flowchart of a control method in one embodiment of the present disclosure. The method includes the following steps.

S501: loading and running by the host system the BIOS system in the first memory during a boot process of the electronic device.

S502: controlling by the embedded controller to cut off a power supply of the first memory and maintain a power supply of the second memory connected to the controller after the electronic device completes a power-on self-test.

If the BIOS system notifies the embedded controller that the power-on self-test is completed after the BIOS system completes the power-on self-test, the embedded controller cuts off a power supply of the first memory.

S502 is described by taking an implementation of controlling the first memory to be in an inaccessible state and controlling the second memory to be in an accessible state by the controller as an example. Other implementations are also applicable to the present embodiment.

S503: obtaining by the host system an operation request for the BIOS program.

The operation request is configured to request to operate the BIOS system.

S504: controlling the host system to enter a system management mode if the host system obtains a system management interrupt indication of a target object for the operation request, so that the BIOS system running on the host system processes the operation request.

The target object can be an application program, an operating system or the like running on the host system.

If the host system receives the system management interrupt indication at a same time or after obtaining the operation request, the host system confirms a request to operate a mode of the BIOS system which does not belong to updating via an embedded controller (or a controller such as a FPGA) the BIOS system to the second memory. However, since the first memory is in an inaccessible mode at the present time, the host system cannot directly operate the first memory based on the operation request. Therefore, the host system also considers the operation request to be illegal and may directly discard or ignore the operation request to avoid the BIOS and other boot systems from being attacked.

The present embodiment takes the boot system as the BIOS system as an example. When the boot system is not a BIOS system, the host system still triggers a SMI mode after obtaining a system management interrupt, and the BIOS system (or UEFI system) triggers the operation request.

S505: determining by the BIOS system a data type of the operation required by the operation request if the BIOS system confirms that the target object belongs to a software program with authority to trigger a system management interrupt.

A write operation or modification operation to the BIOS system (or other boot system) can modify data parameters of the BIOS system or program codes of the BIOS system. Therefore, the data type can be divided into two types: parameter data and code.

There may be one or more software programs that have authority to trigger a system management interrupt. A type of the software program may include an operating system or a specified application program such as an application program provided by a manufacturer of a boot system (such as a BIOS system).

S506: detecting by the BIOS system whether the parameter data requested by the operation request conforms to a parameter variable format defined in a system specification of the BIOS system and verification data carried in the operation request is configured legality verification data, if the BIOS system confirms that the data type of the operation required by the operation request is parameter data.

If the parameter data requested by the operation request conforms to the parameter variable format defined in the system specification of the BIOS system and the verification data carried in the operation request is configured legality verification data, S508 is executed. If the parameter data requested by the operation request does not conform to the parameter variable format defined in the system specification of the BIOS system and the verification data carried in the operation request is not configured legality verification data, the operation request is ignored.

When the operation request is configured to request to update the parameter data of the BIOS system, only if the system management interrupt indication corresponding to the operation request is set by a legal software program, the parameter data requested by the operation request conforms to the parameter variable format defined in the system specification of the BIOS system, and the verification data carried in the operation request is configured legality verification data, the operation request is determined to be a legitimate operation request.

S507: detecting by the BIOS system whether the verification data carried in the operation request is configured validity verification data if the BIOS system confirms that the data type required for the operation request is a code.

If the verification data carried in the operation request is configured validity verification data, S508 is executed. If the verification data carried in the operation request is not configured validity verification data, the operation request is ignored.

When the operation request is configured to request to update a code of the BIOS system, only if the system management interrupt indication corresponding to the operation request is set by a legal software program, and the verification data carried in the operation request is configured legality verification data, the operation request is determined to be a legitimate operation request.

S506 and S508 are only described by taking a situation of determining that the operation request is not an illegal operation request as an example. Other situations described above are also applicable to the present embodiment.

S508: sending by the BIOS system the operation request to the embedded controller.

S509: storing by the embedded controller update data generated by the operation corresponding to the operation request in the second memory.

The present embodiment takes an embedded controller as the controller as an example to describe. The present embodiment is also applicable if the embedded controller is replaced with any other controller.

In the above method embodiments, after the electronic device is restarted, the boot system needs to be updated based on update data of the configured boot system to make the update data of the boot system take effect. Therefore, during the power-on self-test of the electronic device, the host system may update the boot system in the first memory according to update data in the second memory.

In the method embodiments, some descriptions about various components in the electronic device and interactive controls between the various components are relatively simple. Details may be referred to previous related embodiments of the electronic device, which are not repeated herein.

The present disclosure provides a computer-readable storage medium storing at least one instruction and at least one program, code set, or instruction set. The at least one instruction, and the at least one program, code set, or instruction set are loaded and executed by the processor to implement the control method described in any of the above embodiment.

Various embodiments in the present specification are described in a progressive manner. Each embodiment focuses on differences from other embodiments. Same or similar parts between the various embodiments may be referred to each other. Features described in the various embodiments in the present specification can be replaced or combined with each other, so that a person skilled in the art can implement or use the present disclosure. As device embodiments are basically like the method embodiments, descriptions of the device embodiments are relatively simple and relevant details can be referred to part of descriptions of the method embodiments.

As disclosed, after the electronic device completes a power-on self-test, the controller controls the first memory used to store the boot system in the electronic device to be in an inaccessible state and controls the second memory to be in an accessible state, so that an operation for data related to the boot system is transferred to the second memory, and the first memory where the boot system is located cannot be operated, thereby avoiding directly operating the boot system in the first memory and reducing a risk of the boot system being attacked due to illegal operations.

The above descriptions of the disclosed embodiments enable a person skilled in the art to implement or use the present disclosure. Various modifications to these embodiments are obvious to a person skilled in the art. General principles defined herein can be implemented in other embodiments without departing from the spirit or scope of the present disclosure. Therefore, the present disclosure is not limited to the embodiments illustrated herein but should conform to a widest scope consistent with the principles and novel features disclosed herein.

What is claimed is:

1. An electronic device, comprising:
    a controller;
    a first memory, connected to the controller and storing at least a boot system;
    a second memory, connected to the controller, for storing update data of the boot system, wherein, after the electronic device completes a power-on self-test, the controller controls the first memory to be in an inaccessible state and controls the second memory to be in an accessible state.

2. The device according to claim 1, further comprising a host system connected to the first memory, wherein:
    the host system is configured to load and run the boot system in the first memory during a boot process of the electronic device;
    the host system is further configured to obtain an operation request for the boot system after the electronic device completes a power-on self-test, the operation request is configured to request to operate the boot system, if the operation request is confirmed not to be an illegal operation request, the host system forward the operation request to the controller; and
    the controller is further configured to store update data for the boot system in the second memory based on the operation request.

3. The device according to claim 1, wherein the controller cuts off a power supply of the first memory to control the first memory to be in an inaccessible state.

4. The device according to claim 3, further comprising a power supply module, wherein:
    the first memory is connected to the power supply module via a controllable port on the controller; and
    the controller cuts off the power supply of the first memory by controlling to cut off a connection between the controllable port and the power supply module, so that the first memory is in the inaccessible state.

5. The device according to claim 1, wherein the host system sends the operation request to the controller if the operation request is confirmed not to be an illegal operation request, so that the controller stores update data generated by an operation in the second memory.

6. The device according to claim 5, wherein sending by the host system the operation request to the controller if the operation request is confirmed not to be an illegal operation request includes:
    sending the operation request to the controller if a system management interruption indication is detected by the host system and the operation request is confirmed not to be an illegal operation request.

7. The device according to claim 6, wherein confirming by the host system the operation request not to be an illegal operation request includes:
    confirming by the host system that the operation request satisfies legal operation conditions, wherein the legal operation conditions at least include: the system management interruption indication is triggered and generated by a software program with triggering authority, or verification data carried in the operation request is configured legality verification data.

8. The device according to claim 7, wherein the legal operation conditions further include:
    if the operation request is configured to request to update parameter data of the boot system, the updated parameter data requested by the operation request conforms to a parameter variable format defined in a system specification of the boot system.

9. The device according to claim 5, wherein the boot system in the first memory is updated according to the update data during the power-on self-test process.

10. The device according to claim 2, wherein determining by the host system whether the operation request is an illegal operation request via the boot system includes:
    determining whether verification data carried in the operation request belongs to configured legality verification data if the operation request carries the verification data for legality identification; and determining whether parameter data requested to be updated by the operation request conforms to a parameter variable format defined in a system specification of the boot system if the operation request is configured to request to update the parameter data of the boot system.

11. The device according to claim 5, wherein:
the boot system includes, in addition to a system boot program configured to implement a power-on self-test and a system self-test of the electronic device, a firmware program of a processing device in the electronic device; or
the boot system is a system boot program configured to implement a power-on self-test and a system self-test of the electronic device.

12. A control method, comprising:
loading and running by a host system a boot system in a first memory during a booting process of an electronic device; and
controlling the first memory to be in an inaccessible state and controlling a second memory to be in an accessible state by a controller after the electronic device completes a power-on self-test, wherein the second memory is connected to the controller and is configured to store update data of the boot system.

13. The method according to claim 12, further comprising:
obtaining by the host system an operation request for the boot system after the electronic device completes the power-on self-test, wherein the operation request is configured to request to operate the boot system; and
sending by the host system the operation request to the controller if the operation request is confirmed not to be an illegal operation request, so that the controller stores update data generated by an operation in the second memory.

14. The method according to claim 13, wherein the sending of the operation request to the controller by the host system if the operation request is confirmed not to be an illegal operation request includes:
sending the operation request to the controller if a system management interruption indication is detected by the host system and the operation request is confirmed not to be an illegal operation request.

15. The method according to claim 14, wherein confirming by the host system the operation request not to be an illegal operation request includes:

confirming by the host system that the operation request satisfies legal operation conditions, wherein the legal operation conditions at least include: the system management interruption indication is triggered and generated by a software program with triggering authority, or verification data carried in the operation request is configured legality verification data.

16. The method according to claim 15, wherein the legal operation conditions further include:
if the operation request is configured to request to update parameter data of the boot system, the updated parameter data requested by the operation request conforms to a parameter variable format defined in a system specification of the boot system.

17. The method according to claim 13, further comprising:
updating the boot system in the first memory according to the update data during the power-on self-test process.

18. The method according to claim 13, wherein the controller cuts off a power supply of the first memory to control the first memory to be in an inaccessible state.

19. The method according to claim 12, wherein:
the electronic device further includes a power supply module;
the first memory is connected to the power supply module via a controllable port on the controller; and
the controller cuts off the power supply of the first memory by controlling to cut off a connection between the controllable port and the power supply module, so that the first memory is in the inaccessible state.

20. The method according to claim 14, wherein determining by the host system whether the operation request is an illegal operation request via the boot system includes:
determining whether verification data carried in the operation request belongs to configured legality verification data if the operation request carries the verification data for legality identification; and
determining whether parameter data requested to be updated by the operation request conforms to a parameter variable format defined in a system specification of the boot system if the operation request is configured to request to update parameter data of the boot system.

\* \* \* \* \*